United States Patent
Matthews et al.

(10) Patent No.: US 9,430,130 B2
(45) Date of Patent: *Aug. 30, 2016

(54) CUSTOMIZATION OF AN IMMERSIVE ENVIRONMENT

(71) Applicant: Microsoft Technology Licensing, LLC, Redmond, WA (US)

(72) Inventors: David A. Matthews, San Francisco, CA (US); Matthew I. Worley, Bellevue, WA (US); Nils A. Sundelin, Bothell, WA (US); Tsz Yan Wong, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

This patent is subject to a terminal disclaimer.

(21) Appl. No.: 14/092,790

(22) Filed: Nov. 27, 2013

(65) Prior Publication Data

US 2014/0089856 A1 Mar. 27, 2014

Related U.S. Application Data

(63) Continuation of application No. 13/656,639, filed on Oct. 19, 2012, now Pat. No. 8,627,227, which is a continuation of application No. 12/972,611, filed on Dec. 20, 2010.

(51) Int. Cl.
*G06F 3/0481* (2013.01)
*G06F 3/0484* (2013.01)
(Continued)

(52) U.S. Cl.
CPC .............. *G06F 3/04842* (2013.01); *G06F 3/01* (2013.01); *G06F 3/0481* (2013.01); *G06F 9/4443* (2013.01); *G06F 17/30899* (2013.01); *G06F 2203/04803* (2013.01)

(58) Field of Classification Search
CPC ................... G06F 3/0481; G06F 2203/04803; G06F 3/04886
See application file for complete search history.

(56) References Cited

U.S. PATENT DOCUMENTS 4,823,283 A 4/1989 Diehm et al.
5,045,997 A 9/1991 Watanabe
(Continued)

FOREIGN PATENT DOCUMENTS

CN 1904823 1/2007
CN 101036104 9/2007
(Continued)

OTHER PUBLICATIONS

"Foreign Office Action", CN Application No. 201180071196.8, Sep. 11, 2014, 13 pages.
(Continued)

*Primary Examiner* — Kieu Vu
*Assistant Examiner* — Blaine Basom
(74) *Attorney, Agent, or Firm* — Judy Yee; Micky Minhas

(57) ABSTRACT

A computing device includes an immersive environment module for facilitating simultaneous display of a plurality of applications on a display device without relying on system chrome. At least a first of the applications is displayed in a primary region of the display. The computing device also includes a UI management component for enabling a user selection of an application for simultaneous display on the display device with at least one other application. Processing logic is configured to determine a size in at least one direction of content of a user-selected application as it is displayed on a non-primary region of the display device simultaneous with display of content of the first application on the primary region of the display device. The determination is based at least in part on one or more pre-defined size requirements specified by the selected application.

20 Claims, 10 Drawing Sheets

(51) Int. Cl.
*G06F 17/30* (2006.01)
*G06F 9/44* (2006.01)
*G06F 3/01* (2006.01)

(56) References Cited

U.S. PATENT DOCUMENTS

| | | | |
|---|---|---|---|
| 5,046,001 A | 9/1991 | Barker et al. | |
| 5,189,732 A | 2/1993 | Kondo | |
| 5,258,748 A | 11/1993 | Jones | |
| 5,297,032 A | 3/1994 | Trojan et al. | |
| 5,321,750 A | 6/1994 | Nadan | |
| 5,339,392 A | 8/1994 | Risberg et al. | |
| 5,432,932 A | 7/1995 | Chen et al. | |
| 5,463,725 A | 10/1995 | Henckel et al. | |
| 5,485,197 A | 1/1996 | Hoarty | |
| 5,487,143 A * | 1/1996 | Southgate | G06F 3/0481 715/790 |
| 5,495,566 A | 2/1996 | Kwatinetz | |
| 5,515,495 A | 5/1996 | Ikemoto | |
| 5,574,836 A | 11/1996 | Broemmelsiek | |
| 5,586,244 A * | 12/1996 | Berry | G06F 3/0481 715/788 |
| 5,598,523 A | 1/1997 | Fujita | |
| 5,611,060 A | 3/1997 | Belfiore et al. | |
| 5,623,613 A | 4/1997 | Rowe et al. | |
| 5,640,176 A | 6/1997 | Mundt et al. | |
| 5,650,827 A | 7/1997 | Tsumori et al. | |
| 5,657,049 A | 8/1997 | Ludolph et al. | |
| 5,675,329 A | 10/1997 | Barker | |
| 5,687,331 A | 11/1997 | Volk et al. | |
| 5,712,995 A | 1/1998 | Cohn | |
| 5,742,285 A | 4/1998 | Ueda | |
| 5,771,042 A | 6/1998 | Santos-Gomez | |
| 5,793,415 A | 8/1998 | Gregory et al. | |
| 5,819,284 A | 10/1998 | Farber et al. | |
| 5,860,073 A | 1/1999 | Ferrel et al. | |
| 5,880,725 A | 3/1999 | Southgate | |
| 5,889,517 A * | 3/1999 | Ueda | G09G 5/14 715/803 |
| 5,905,492 A | 5/1999 | Straub et al. | |
| 5,914,720 A | 6/1999 | Maples et al. | |
| 5,940,076 A | 8/1999 | Sommers et al. | |
| 5,959,621 A | 9/1999 | Nawaz et al. | |
| 5,963,204 A | 10/1999 | Ikeda et al. | |
| 6,008,809 A | 12/1999 | Brooks | |
| 6,008,816 A | 12/1999 | Eisler | |
| 6,009,519 A | 12/1999 | Jones et al. | |
| 6,011,542 A | 1/2000 | Durrani et al. | |
| 6,028,600 A | 2/2000 | Rosin et al. | |
| 6,057,839 A | 5/2000 | Advani et al. | |
| 6,064,383 A | 5/2000 | Skelly | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,166,736 A | 12/2000 | Hugh | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 | 4/2001 | Straub et al. | |
| 6,232,971 B1 | 5/2001 | Haynes | |
| 6,266,098 B1 | 7/2001 | Cove et al. | |
| 6,278,448 B1 | 8/2001 | Brown et al. | |
| 6,281,940 B1 | 8/2001 | Sciammarella | |
| 6,311,058 B1 | 10/2001 | Wecker et al. | |
| 6,369,837 B1 | 4/2002 | Schirmer | |
| 6,385,630 B1 | 5/2002 | Ejerhed | |
| 6,396,963 B2 | 5/2002 | Shaffer | |
| 6,411,307 B1 | 6/2002 | Rosin et al. | |
| 6,424,338 B1 | 7/2002 | Andersone | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 | 1/2003 | Lortz | |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,538,635 B1 | 3/2003 | Ringot | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,601,233 B1 | 7/2003 | Underwood | |
| 6,608,637 B1 | 8/2003 | Beaton et al. | |
| 6,628,309 B1 | 9/2003 | Dodson et al. | |
| 6,636,246 B1 | 10/2003 | Gallo et al. | |
| 6,662,023 B1 | 12/2003 | Helle | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 * | 4/2004 | Santoro | G09G 5/14 715/765 |
| 6,784,925 B1 | 8/2004 | Tomat et al. | |
| 6,798,421 B2 | 9/2004 | Baldwin | |
| 6,801,203 B1 | 10/2004 | Hussain | |
| 6,807,558 B1 | 10/2004 | Hassett et al. | |
| 6,832,355 B1 | 12/2004 | Duperrouzel et al. | |
| 6,857,104 B1 | 2/2005 | Cahn | |
| 6,865,297 B2 | 3/2005 | Loui | |
| 6,873,329 B2 | 3/2005 | Cohen et al. | |
| 6,876,312 B2 | 4/2005 | Yu | |
| 6,880,132 B2 | 4/2005 | Uemura | |
| 6,885,974 B2 | 4/2005 | Holle | |
| 6,904,597 B2 | 6/2005 | Jin | |
| 6,920,445 B2 | 7/2005 | Bae | |
| 6,938,101 B2 | 8/2005 | Hayes et al. | |
| 6,961,731 B2 | 11/2005 | Holbrook | |
| 6,971,067 B1 | 11/2005 | Karson et al. | |
| 6,972,776 B2 | 12/2005 | Davis et al. | |
| 6,975,306 B2 | 12/2005 | Hinckley | |
| 6,976,210 B1 | 12/2005 | Silva et al. | |
| 6,978,303 B1 | 12/2005 | McCreesh et al. | |
| 6,983,310 B2 | 1/2006 | Rouse | |
| 6,987,991 B2 | 1/2006 | Nelson | |
| 7,013,041 B2 | 3/2006 | Miyamoto | |
| 7,017,119 B1 | 3/2006 | Johnston et al. | |
| 7,019,757 B2 | 3/2006 | Brown et al. | |
| 7,028,264 B2 | 4/2006 | Santoro et al. | |
| 7,032,187 B2 | 4/2006 | Keely, Jr. et al. | |
| 7,036,090 B1 | 4/2006 | Nguyen | |
| 7,036,091 B1 | 4/2006 | Nguyen | |
| 7,042,460 B2 | 5/2006 | Hussain et al. | |
| 7,051,291 B2 | 5/2006 | Sciammarella et al. | |
| 7,058,955 B2 | 6/2006 | Porkka | |
| 7,065,385 B2 | 6/2006 | Jarrad et al. | |
| 7,065,386 B1 | 6/2006 | Smethers | |
| 7,075,535 B2 | 7/2006 | Aguera y Arcas | |
| 7,089,507 B2 | 8/2006 | Lection et al. | |
| 7,091,998 B2 | 8/2006 | Miller-Smith | |
| 7,093,201 B2 | 8/2006 | Duarte | |
| 7,106,349 B2 | 9/2006 | Baar et al. | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,146,573 B2 | 12/2006 | Brown et al. | |
| 7,155,729 B1 | 12/2006 | Andrew et al. | |
| 7,158,123 B2 | 1/2007 | Myers et al. | |
| 7,158,135 B2 | 1/2007 | Santodomingo et al. | |
| 7,178,111 B2 | 2/2007 | Glein et al. | |
| 7,210,099 B2 | 4/2007 | Rohrabaugh et al. | |
| 7,216,588 B2 | 5/2007 | Suess | |
| 7,249,326 B2 | 7/2007 | Stoakley et al. | |
| 7,262,775 B2 | 8/2007 | Calkins et al. | |
| 7,263,668 B1 | 8/2007 | Lentz | |
| 7,280,097 B2 | 10/2007 | Chen | |
| 7,283,620 B2 | 10/2007 | Adamczyk | |

(56) References Cited

U.S. PATENT DOCUMENTS

| | | |
|---|---|---|
| 7,289,806 B2 | 10/2007 | Morris et al. |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,512,966 B2 | 3/2009 | Lyons, Jr. et al. |
| 7,577,914 B1 | 8/2009 | Stuple et al. |
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,681,143 B2 | 3/2010 | Lindsay et al. |
| 7,702,683 B1 | 4/2010 | Kirshenbaum |
| 7,755,674 B2 | 7/2010 | Kaminaga |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,225,193 B1 | 7/2012 | Kleinschnitz et al. |
| 8,230,355 B1 | 7/2012 | Bauermeister et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,429,565 B2 | 4/2013 | Agarawala et al. |
| 8,548,431 B2 | 10/2013 | Teng et al. |
| 8,560,959 B2 | 10/2013 | Zaman et al. |
| 8,627,227 B2 | 1/2014 | Matthews et al. |
| 9,052,820 B2 | 6/2015 | Jarrett et al. |
| 9,104,307 B2 | 8/2015 | Jarrett et al. |
| 9,104,440 B2 | 8/2015 | Jarrett et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway et al. |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060658 A1 | 3/2005 | Tsukiori |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005114 A1 | 1/2006 | Williamson et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0015820 A1 | 1/2006 | Wood |

(56) References Cited

U.S. PATENT DOCUMENTS

| | | |
|---|---|---|
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0246955 A1 | 11/2006 | Nirhamo |
| 2006/0248404 A1 | 11/2006 | Lindsay et al. |
| 2006/0248471 A1 | 11/2006 | Lindsay et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0157089 A1 | 7/2007 | Van Os et al. |
| 2007/0171192 A1 | 7/2007 | Seo et al. |
| 2007/0180401 A1* | 8/2007 | Singh .................... G06F 3/0481 715/794 |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0226647 A1 | 9/2007 | Louch |
| 2007/0233654 A1 | 10/2007 | Karlson et al. |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0259042 A1 | 10/2008 | Thorn |

(56) References Cited

U.S. PATENT DOCUMENTS

| | | |
|---|---|---|
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0021486 A1 | 1/2009 | Chaudhri et al. |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0059073 A1 | 3/2009 | Cho et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0094562 A1 | 4/2009 | Jeong et al. |
| 2009/0103515 A1 | 4/2009 | Pointer |
| 2009/0106691 A1 | 4/2009 | Ballard et al. |
| 2009/0106696 A1 | 4/2009 | Duarte |
| 2009/0109243 A1 | 4/2009 | Kraft |
| 2009/0117942 A1 | 5/2009 | Boningue et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0210795 A1 | 8/2009 | Katsuranis |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0030578 A1 | 2/2010 | Siddique et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0066698 A1 | 3/2010 | Seo |
| 2010/0070931 A1 | 3/2010 | Nichols |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079413 A1 | 4/2010 | Kawashima et al. |
| 2010/0081475 A1 | 4/2010 | Chiang et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0309148 A1 | 12/2010 | Fleizach et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |

(56) References Cited

U.S. PATENT DOCUMENTS

| | | |
|---|---|---|
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0124376 A1 | 5/2011 | Kim et al. |
| 2011/0126156 A1 | 5/2011 | Krishnaraj et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167341 A1 | 7/2011 | Cranfill et al. |
| 2011/0173556 A1 | 7/2011 | Czerwinski et al. |
| 2011/0173568 A1 | 7/2011 | Royal, Jr. et al. |
| 2011/0175930 A1 | 7/2011 | Hwang et al. |
| 2011/0179387 A1 | 7/2011 | Shaffer et al. |
| 2011/0185318 A1 | 7/2011 | Hinckley et al. |
| 2011/0191675 A1 | 8/2011 | Kauranen |
| 2011/0209099 A1 | 8/2011 | Hinckley |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1 | 10/2011 | Chaudhri |
| 2012/0005584 A1 | 1/2012 | Seago et al. |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0102433 A1 | 4/2012 | Falkenburg |
| 2012/0151397 A1 | 6/2012 | Oberstein et al. |
| 2012/0159383 A1 | 6/2012 | Matthews et al. |
| 2012/0159395 A1 | 6/2012 | Deutsch et al. |
| 2012/0159402 A1 | 6/2012 | Nurmi et al. |
| 2012/0167008 A1 | 6/2012 | Zaman |
| 2012/0167011 A1 | 6/2012 | Zaman |
| 2012/0174005 A1 | 7/2012 | Deutsch |
| 2012/0174029 A1 | 7/2012 | Bastide et al. |
| 2012/0179992 A1 | 7/2012 | Smuga |
| 2012/0180001 A1 | 7/2012 | Griffin et al. |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0244841 A1 | 9/2012 | Teng et al. |
| 2012/0254780 A1 | 10/2012 | Mouton et al. |
| 2012/0265644 A1 | 10/2012 | Roa et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard |
| 2013/0067420 A1 | 3/2013 | Pittappilly |
| 2013/0093757 A1 | 4/2013 | Cornell |
| 2013/0323992 A1 | 12/2013 | Brobst et al. |
| 2015/0317062 A1 | 11/2015 | Jarrett et al. |

FOREIGN PATENT DOCUMENTS

| | | |
|---|---|---|
| CN | 101377920 | 3/2009 |
| CN | 102591571 | 7/2012 |
| JP | 05313850 | 11/1993 |
| JP | 09128192 | 5/1997 |
| JP | 2000155637 | 6/2000 |
| JP | 2003186593 | 7/2003 |
| KR | 20100010072 | 2/2010 |
| RU | 2363033 | 7/2009 |
| WO | WO-2010110613 | 9/2010 |
| WO | WO-2012087847 | 6/2012 |

OTHER PUBLICATIONS

"Non-Final Office Action", U.S. Appl. No. 13/118,347, Dec. 3, 2014, 28 pages.

"Foreign Office Action", CO Application No. 13300265, Sep. 24, 2014, 10 Pages.

"Non-Final Office Action", U.S. Appl. No. 13/118,339, Dec. 10, 2014, 16 pages.

"Foreign Office Action", RU Application No. 2013152630, Oct. 26, 2015, 5 pages.

"Foreign Office Action", JP Application No. 2014-512824, Nov. 6, 2015, 5 pages.

"Foreign Office Action", CL Application No. 3370-2013, Oct. 29, 2015, 6 pages.

"Foreign Office Action", CN Application No. 201110429236.3, Dec. 17, 2013, 10 Pages.

"Extended European Search Report", EP Application No. 11866699.9, Jan. 15, 2015, 6 pages.

"Extended European Search Report", EP Application No. 11866772.4, Jan. 15, 2015, 6 pages.

"Foreign Office Action", CN Application No. 201110429236.3, Feb. 16, 2015, 7 Pages.

"Notice of Allowance", U.S. Appl. No. 13/118,339, Mar. 31, 2015, 7 pages.

"Notice of Allowance", U.S. Appl. No. 13/118,347, Apr. 1, 2015, 7 pages.

"Notice of Allowance", U.S. Appl. No. 13/657,646, Feb. 6, 2015, 15 pages.

"Foreign Office Action", CO Application No. 13300265, Apr. 21, 2015, 11 Pages.

"Final Office Action", U.S. Appl. No. 12/972,611, Jun. 22, 2015, 28 pages.

"Foreign Office Action", PH Application No. PH/1/2013/502367, Apr. 24, 2015, 3 pages.

"Foreign Office Action", CL Application No. 3370-2013, May 7, 2015, 6 pages.

"Non-Final Office Action", U.S. Appl. No. 13/657,646, Aug. 12, 2014, 14 pages.

"First Examination Report", NZ Application No. 618284, May 20, 2014, 2 pages.

"Further Examination Report", NZ Application No. 618284, Jul. 13, 2015, 2 pages.

(56) References Cited

OTHER PUBLICATIONS

"Foreign Notice of Allowance", CN Application No. 201110429236.3, Aug. 21, 2015, 3 Pages.
"Extended European Search Report", EP Application No. 11851985.9, Oct. 7, 2014, 6 pages.
"Foreign Office Action", CN Application No. 201110429236.3, Aug. 13, 2014, 11 Pages.
"Non-Final Office Action", U.S. Appl. No. 12/972,611, Aug. 20, 2014, 26 pages.
"Advisory Action", U.S. Appl. No. 12/414,382, Jan. 20, 2012, 3 pages.
"Advisory Action", U.S. Appl. No. 12/433,605, Apr. 5, 2012, 3 pages.
Schmalstieg et al.,"Bridging Multiple User Interface Dimensions with Augmented Reality", Retrieved from: >http:!/3citeseerx.ist.psu.edu/viewdoc/download?doi=10.1.1.43.5429&rep=rep1 &type=pdf< Proceedings IEEE and ACM D International Symposium on Augmented Reality, 2000, 10 pages.
"Corrected Notice of Allowance", U.S. Appl. No. 13/656,639, Dec. 11, 2013, 3 pages.
"Final Office Action", U.S. Appl. No. 11/305,789, Apr. 1, 2009, 10 pages.
"Final Office Action", U.S. Appl. No. 12/721,422, Mar. 7, 2013, 10 pages.
"Final Office Action", U.S. Appl. No. 12/433,605, Feb. 3, 2012, 11 pages.
"Final Office Action", U.S. Appl. No. 13/657,646, May 6, 2013, 12 pages.
"Final Office Action", U.S. Appl. No. 12/484,799, Apr. 30, 2012, 13 pages.
"Final Office Action", U.S. Appl. No. 13/656,354, Jun. 17, 2013, 14 pages.
"Final Office Action", U.S. Appl. No. 11/502,264, Feb. 4, 2010, 15 pages.
"Final Office Action", U.S. Appl. No. 12/469,458, Nov. 17, 2011, 15 pages.
"Final Office Action", U.S. Appl. No. 11/502,264, Mar. 29, 2013, 16 pages.
"Final Office Action", U.S. Appl. No. 12/413,977, Nov. 17, 2011, 16 pages.
"Final Office Action", U.S. Appl. No. 12/244,545, Dec. 7, 2011, 16 pages.
"Final Office Action", U.S. Appl. No. 12/560,081, Mar. 14, 2012, 16 pages.
"Final Office Action", U.S. Appl. No. 13/658,694, Oct. 30, 2013, 17 pages.
"Final Office Action", U.S. Appl. No. 12/469,480, Feb. 9, 2012, 17 pages.
"Final Office Action", U.S. Appl. No. 12/433,667, Sep. 13, 2011, 17 pages.
"Final Office Action", U.S. Appl. No. 13/657,621, Sep. 10, 2013, 18 pages.
"Final Office Action", U.S. Appl. No. 12/983,106, Oct. 7, 2013, 19 pages.
"Final Office Action", U.S. Appl. No. 12/972,611, Oct. 11, 2013, 19 pages.
"Final Office Action", U.S. Appl. No. 13/656,574, Aug. 23, 2013, 20 pages.
"Final Office Action", U.S. Appl. No. 12/414,476, Dec. 1, 2011, 20 pages.
"Final Office Action", U.S. Appl. No. 13/118,339, Aug. 22, 2013, 21 pages.
"Final Office Action", U.S. Appl. No. 12/972,967, Oct. 11, 2013, 21 pages.
"Final Office Action", U.S. Appl. No. 13/229,693, Sep. 4, 2013, 23 pages.
"Final Office Action", U.S. Appl. No. 12/244,545, Sep. 7, 2012, 23 pages.
"Final Office Action", U.S. Appl. No. 13/118,347, Aug. 15, 2013, 25 pages.
"Final Office Action", U.S. Appl. No. 13/655,386, Jun. 6, 2013, 34 pages.
"Final Office Action", U.S. Appl. No. 13/657,789, Jun. 21, 2013, 35 pages.
"Final Office Action", U.S. Appl. No. 13/224,258, Sep. 11, 2013, 37 pages.
"Final Office Action", U.S. Appl. No. 12/414,382, Dec. 23, 2011, 7 pages.
"Final Office Action", U.S. Appl. No. 11/502,264, Apr. 3, 2009, 9 pages.
"Non-Final Office Action", U.S. Appl. No. 13/196,272, Feb. 6, 2013, 10 pages.
"Non-Final Office Action", U.S. Appl. No. 13/656,354, Feb. 6, 2013, 10 pages.
"Non-Final Office Action", U.S. Appl. No. 12/433,605, Jun. 24, 2011, 10 pages.
"Non-Final Office Action", U.S. Appl. No. 13/228,707, Oct. 25, 2013, 12 pages.
"Non-Final Office Action", U.S. Appl. No. 13/655,390, Dec. 17, 2012, 12 pages.
"Non-Final Office Action", U.S. Appl. No. 12/484,799, Aug. 11, 2011, 12 pages.
"Non-Final Office Action", U.S. Appl. No. 13/118,204, Feb. 28, 2013, 13 pages.
"Non-Final Office Action", U.S. Appl. No. 13/658,694, Apr. 26, 2013, 13 pages.
"Non-Final Office Action", U.S. Appl. No. 13/657,646, Jan. 3, 2013, 13 pages.
"Non-Final Office Action", U.S. Appl. No. 12/469,419, May 23, 2012, 13 pages.
"Non-Final Office Action", U.S. Appl. No. 13/073,300, Jul. 25, 2013, 13 pages.
"Non-Final Office Action", U.S. Appl. No. 12/484,799, Aug. 7, 2012, 13 pages.
"Non-Final Office Action", U.S. Appl. No. 13/118,347, Feb. 12, 2013, 14 pages.
"Non-Final Office Action", U.S. Appl. No. 11/502,264, Sep. 14, 2012, 14 pages.
"Non-Final Office Action", U.S. Appl. No. 12/469,458, Sep. 21, 2012, 14 pages.
"Non-Final Office Action", U.S. Appl. No. 12/469,480, Sep. 22, 2011, 14 pages.
"Non-Final Office Action", U.S. Appl. No. 13/118,339, Feb. 11, 2013, 15 pages.
"Non-Final Office Action", U.S. Appl. No. 12/433,667, Jun. 7, 2011, 15 pages.
"Non-Final Office Action", U.S. Appl. No. 11/502,264, Sep. 30, 2009, 15 pages.
"Non-Final Office Action", U.S. Appl. No. 12/469,419, Nov. 9, 2011, 15 pages.
"Non-Final Office Action", U.S. Appl. No. 12/469,458, Jul. 1, 2011, 15 pages.
"Non-Final Office Action", U.S. Appl. No. 12/244,545, Aug. 17, 2011, 15 pages.
"Non-Final Office Action", U.S. Appl. No. 12/480,969, Aug. 7, 2012, 15 pages.
"Non-Final Office Action", U.S. Appl. No. 12/469,480, Oct. 17, 2012, 16 pages.
"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/433,667, Feb. 3, 2012, 16 pages.
"Non-Final Office Action", U.S. Appl. No. 12/413,977, Jul. 19, 2011, 17 pages.
"Non-Final Office Action", U.S. Appl. No. 12/983,106, Nov. 9, 2012, 17 pages.
"Non-Final Office Action", U.S. Appl. No. 11/215,052, Jun. 23, 2011, 17 pages.
"Non-Final Office Action", U.S. Appl. No. 13/118,333, Jul. 5, 2013, 18 pages.

(56) References Cited

OTHER PUBLICATIONS

"Non-Final Office Action", U.S. Appl. No. 12/244,545, Mar. 27, 2012, 18 pages.
"Non-Final Office Action", U.S. Appl. No. 12/413,977, Jul. 20, 2012, 18 pages.
"Non-Final Office Action", U.S. Appl. No. 12/972,967, Jan. 30, 2013, 19 pages.
"Non-Final Office Action", U.S. Appl. No. 13/657,621, Feb. 7, 2013, 19 pages.
"Non-Final Office Action", U.S. Appl. No. 13/118,257, Mar. 5, 2013, 19 pages.
"Non-Final Office Action", U.S. Appl. No. 13/656,574, Jan. 31, 2013, 21 pages.
"Non-Final Office Action", U.S. Appl. No. 13/229,693, Mar. 12, 2013, 21 pages.
"Non-Final Office Action", U.S. Appl. No. 12/414,476, Aug. 3, 2011, 21 pages.
"Non-Final Office Action", U.S. Appl. No. 13/118,221, Mar. 1, 2013, 22 pages.
"Non-Final Office Action", U.S. Appl. No. 13/118,181, Mar. 4, 2013, 22 pages.
"Non-Final Office Action", U.S. Appl. No. 12/414,476, Nov. 9, 2012, 22 pages.
"Non-Final Office Action", U.S. Appl. No. 13/655,386, Dec. 26, 2012, 23 pages.
"Non-Final Office Action", U.S. Appl. No. 13/656,639, Feb. 7, 2013, 29 pages.
"Non-Final Office Action", U.S. Appl. No. 12/972,611, Mar. 13, 2013, 31 pages.
"Non-Final Office Action", U.S. Appl. No. 13/118,321, Jun. 10, 2013, 32 pages.
"Non-Final Office Action", U.S. Appl. No. 13/224,258, Jan. 8, 2013, 35 pages.
"Non-Final Office Action", U.S. Appl. No. 13/657,789, Jan. 9, 2013, 38 pages.
"Non-Final Office Action", U.S. Appl. No. 13/196,272, Sep. 3, 2013, 5 pages.
"Non-Final Office Action", U.S. Appl. No. 11/305,789, Sep. 21, 2009, 5 pages.
"Non-Final Office Action", U.S. Appl. No. 13/492,495, Dec. 19, 2012, 6 pages.
"Non-Final Office Action", U.S. Appl. No. 12/414,434, Aug. 2, 2011, 6 pages.
"Non-Final Office Action", U.S. Appl. No. 12/978,184, Jan. 23, 2013, 7 pages.
"Non-Final Office Action", U.S. Appl. No. 12/414,434, Jan. 17, 2012, 7 pages.
"Non-Final Office Action", U.S. Appl. No. 12/721,422, Oct. 1, 2012, 7 pages.
"Non-Final Office Action", U.S. Appl. No. 12/414,434, May 31, 2012, 7 pages.
"Non-Final Office Action", U.S. Appl. No. 12/977,584, Dec. 7, 2012, 8 pages.
"Non-Final Office Action", U.S. Appl. No. 12/414,458, Jul. 6, 2011, 8 pages.
"Non-Final Office Action", U.S. Appl. No. 12/414,455, Aug. 29, 2011, 8 pages.
"Non-Final Office Action", U.S. Appl. No. 13/492,495, Sep. 17, 2012, 8 pages.
"Non-Final Office Action", U.S. Appl. No. 12/470,558, Nov. 22, 2011, 9 pages.
"Non-Final Office Action", U.S. Appl. No. 12/414,382, Jul. 26, 2011, 9 pages.
"Notice of Allowance", U.S. Appl. No. 12/484,799, Oct. 22, 2012, 10 pages.
"Notice of Allowance", U.S. Appl. No. 13/656,639, Aug. 19, 2013, 14 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/470,558, Aug. 23, 2012, 2 pages.
"Notice of Allowance", U.S. Appl. No. 12/414,455, Jan. 4, 2012, 4 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 13/492,495, Apr. 26, 2013, 5 pages.
"Notice of Allowance", U.S. Appl. No. 13/655,390, May 24, 2013, 5 pages.
"Notice of Allowance", U.S. Appl. No. 12/977,584, Jun. 19, 2013, 5 pages.
"Notice of Allowance", U.S. Appl. No. 11/215,052, Mar. 14, 2012, 5 pages.
"Notice of Allowance", U.S. Appl. No. 12/484,845, Mar. 16, 2012, 5 pages.
"Notice of Allowance", U.S. Appl. No. 12/978,184, Aug. 2, 2013, 5 pages.
"Notice of Allowance", U.S. Appl. No. 12/414,458, Aug. 10, 2011, 6 pages.
"Notice of Allowance", U.S. Appl. No. 12/470,558, Apr. 2, 2012, 7 pages.
"Notice of Allowance", U.S. Appl. No. 11/305,789, Nov. 23, 2009, 8 pages.
"Notice of Allowance", U.S. Appl. No. 12/721,422, Jul. 11, 2013, 9 pages.
"International Search Report and Written Opinion", Application No. PCT/US2011/055524, Jun. 1, 2012, 8 pages.
"International Search Report and Written Opinion", Application No. PCT/US2011/055523, May 10, 2012, 9 pages.
"Restriction Requirement", U.S. Appl. No. 13/658,694, Feb. 6, 2013, 6 pages.
"Supplemental Notice of Allowance", U.S. Appl. No. 12/977,584, Sep. 16, 2013, 2 pages.
"Supplemental Notice of Allowance", U.S. Appl. No. 13/655,390, Sep. 19, 2013, 2 pages.
"Supplemental Notice of Allowance", U.S. Appl. No. 12/977,584, Oct. 11, 2013, 2 pages.
"Supplemental Notice of Allowance", U.S. Appl. No. 13/655,390, Jul. 25, 2013, 2 pages.
"Foreign Notice of Allowance", JP Application No. 2013-546266, Jan. 25, 2016, 4 pages.
"Foreign Office Action", AU Application No. 2011349583, Mar. 29, 2016, 3 pages.
"Foreign Office Action", CN Application No. 201180071183.0, Jan. 28, 2016, 18 pages.
"Foreign Office Action", EP Application No. 11851985.9, Feb. 2, 2016, 4 pages.
"Foreign Office Action", EP Application No. 11866772.4, Feb. 2, 2016, 5 pages.
"Foreign Office Action", EP Application No. 1866699.9, Feb. 3, 2016, 4 pages.
"iOS Human Interface Guidelines", Apple Inc, Retrieved at<<https://itunes.apple.com/in/book/ios-human-interface-guidelines/id877942287?mt=11>>, Mar. 23, 2011, 2 pages.
Budiu,"Usability of iPad Apps and Websites", Retrieved at<<https://tdougher.expressions.syr.edu/wrt307fall12/files/2012/08/ipad-usability_report_1st-edition-1.pdf>>, Dec. 31, 2010, 98 pages.
Foreign Office Action, JP Application No. 2014-512824, Jun. 7, 2016, 6 pages.
Foreign Office Action, PH Application No. 1-2013-502367, Jun. 15, 2016, 2 pages.
Non-Final Office Action, U.S. Appl. No. 13/228,945, Jul. 21, 2016, 20 pages.

\* cited by examiner

CUSTOMIZATION OF AN IMMERSIVE ENVIRONMENT

RELATED APPLICATIONS

This application is a continuation of and claims priority under 35 U.S.C. §120 to U.S. patent application Ser. No. 13/656,639, filed on Oct. 19, 2012, which is a continuation of Ser. No. 12/972,611, filed on Dec. 20, 2010, the disclosures of which are incorporated by reference herein in their entirety.

BACKGROUND

Managing applications and corresponding running items (e.g., open windows) on a computer has become increasingly difficult and burdensome, as computers are more heavily relied upon now than in the past. The availability of computers having increased computer speed and memory, in addition to improved overall computer performance over the last several years has provided users with the capability to efficiently run multiple applications at the same time, which was not practical in the past. Users can run a large variety of applications, and frequently run more than one application at a time.

Conventional operating systems permit users to view and interact with multiple computing applications through windows. Each of these windows generally includes a frame having controls for interacting with the computing application as well as controls for moving, sizing, or otherwise managing the layout of the window. These window frames, however, occupy portions of a display that might otherwise be dedicated to an application's content. Furthermore, managing the layouts of these windows through these controls can be time-consuming, annoying and distracting to users.

SUMMARY

This document describes techniques and apparatuses for creating an immersive environment. The immersive environment described herein can present multiple applications without dedicating significant amounts of a display to window frames for the applications. These techniques and/or apparatuses enable a user to view and interact with the content of a single application that is presented full screen (i.e., without system chrome) on a display while maintaining much of the power and flexibility that is available when multiple window frames are available. System chrome refers to the user-interactive graphical elements provided by the system for identifying and managing the regions or windows In some implementations the amount of space allocated to the applications when they are presented in a non-primary region of the display may be determined at least in part on minimum and/or maximum sizes that are specified by the applications themselves. This capability allows application developers to effectively participate in the process used by the computing device when determining how the content of their applications will be presented on the display. For example, different content from different applications may require different amounts of screen space in order to be useful. Accordingly, different applications may specify different minimum sizes below which they should not be presented on the display. Likewise, there may be a maximum size above which content may no longer be useful in practice because of content limitations or other reasons.

This summary is provided to introduce simplified concepts for managing an immersive environment that are further described below in the Detailed Description. This summary is not intended to identify essential features of the claimed subject matter, nor is it intended for use in determining the scope of the claimed subject matter. Techniques and/or apparatuses for managing an immersive environment are also referred to herein separately or in conjunction as the "techniques" as permitted by the context.

BRIEF DESCRIPTION OF THE DRAWINGS

Embodiments for managing an immersive environment are described with reference to the following drawings. The same numbers are used throughout the drawings to reference like features and components.

DETAILED DESCRIPTION

Overview

Some operating systems permit users to view and interact with a single computing application with little or no window frame, generally by presenting content of an application on all or nearly all of a computer's display. While this technique permits more of an application's content to be viewed, it lacks much of the flexibility permitted by the window-based techniques This document describes techniques and apparatuses for creating an immersive environment in which a user can view and interact with the content of a single application that is presented full screen (e.g., without system chrome) on a display while maintaining much of the power and flexibility that is available when multiple window frames are available. In particular, the immersive environment can present multiple applications without dedicating significant portions of the display to window frames for the applications.

Example Environment

Figure 1:
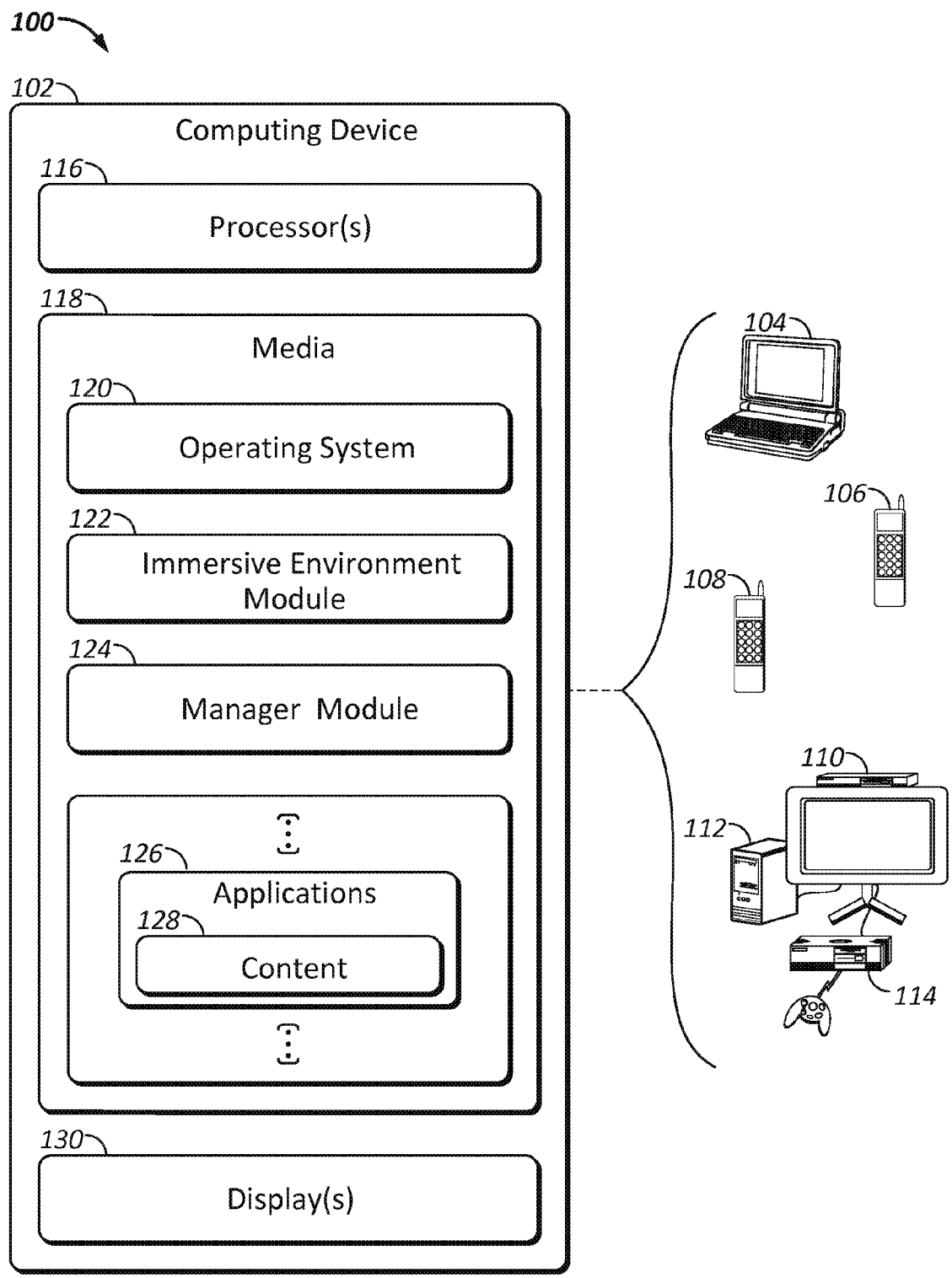
FIG. 1 illustrates an example system in which techniques for creating an immersive environment can be implemented.

FIG. 1 illustrates an example system 100 in which techniques for managing an immersive environment can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, immersive environment module 122, manager module 124, and applications 126, each of which may provide content 128. Computing device 102 also includes or has access to one or more displays 130, four examples of which are illustrated in FIG. 1.

Immersive environment module 122 provides an environment by which a user may view and interact with one or more of applications 126 and corresponding content 128. In some embodiments, this environment presents content of, and enables interaction with, applications with little or no window frame and/or without a need for a user to manually size or position content. This environment can be, but is not required to be, hosted and/or surfaced without use of a windows-based desktop environment. Thus, in some cases immersive environment module 122 presents an immersive environment that is not a window (even one without a substantial frame) and precludes usage of desktop-like displays (e.g., a taskbar). Further still, in some embodiments this immersive environment is similar to an operating system in that it is not closeable or capable of being uninstalled. Examples of immersive environments are provided below as part of describing the techniques, though they are not exhaustive or intended to limit the techniques.

Manager module 124 enables a user to manage an immersive environment and applications 126 presented in the environment. Manager 124 and/or module 122 can be separate from each other and/or operating system 120, or may be combined or integrated in some form. Thus, in some cases operating system 120 includes immersive environment module 122 and manager 124.

Figure 2:
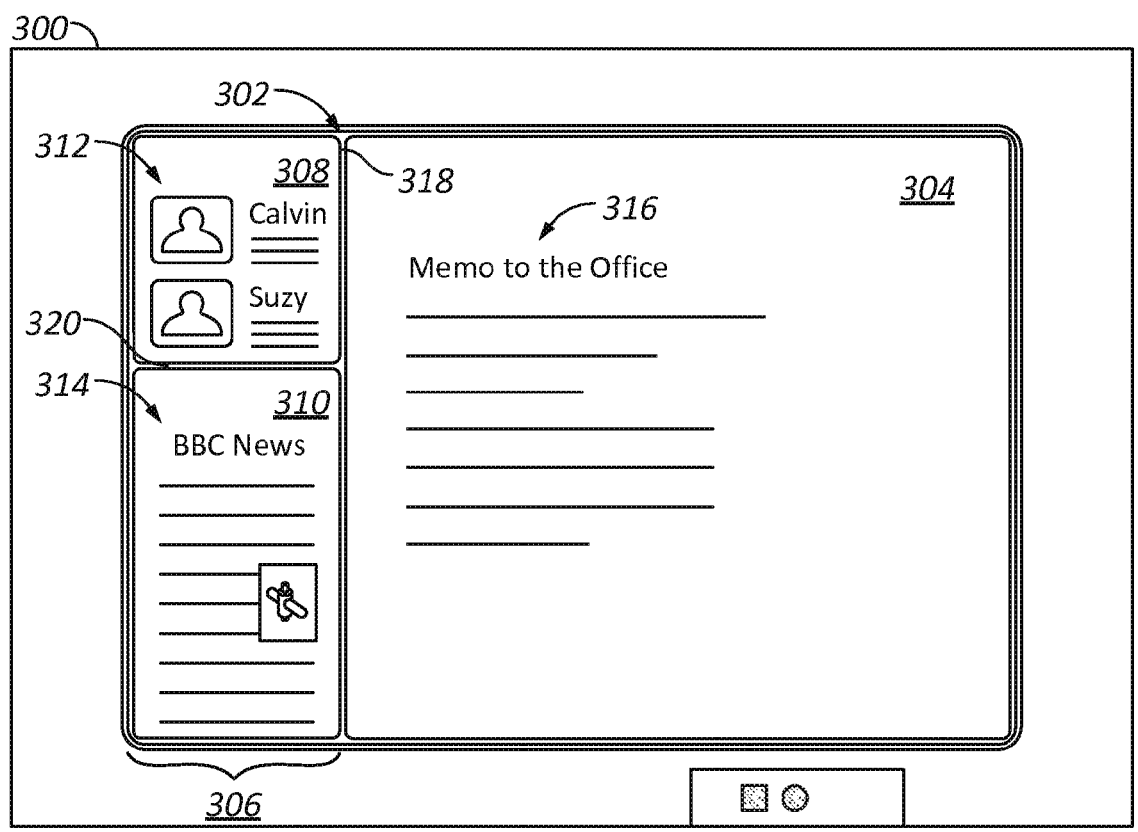
FIG. 2 illustrates an example display having an immersive environment in which the content of three applications is presented.

FIG. 2 shows application work area 300 filled with immersive environment 302. The immersive environment 302 is divided by the manager module 124 into two work areas or regions: a primary region 304 and a non-primary region 306. The two regions 304 and 306 are dividing by a splitting boundary 318. Both the primary region 304 and the non-primary region 306 present various content 128 of applications 126. Note that non-primary region 306 includes two non-primary sections 308 and 310, each of which may be used to present content simultaneously (e.g., in parallel) with each other and that of primary region 304. The non-primary sections 308 and 310 are divided by splitting boundary 320. In this example, content from three applications is presented in parallel: content 312 from a social networking website which is presented by a web browser application, content 314 from a news website which is presented by a web browser application, and content 316 from a local document-viewing application.

The applications that present content in the primary region 304 and the non-primary region 306 are not limited to the aforementioned web browser and document-viewing applications. Other illustrative examples of applications that may be presented in the immersive environment 302 include, without limitation, spreadsheet applications, word processing applications, email applications, photo editing applications and the like. Moreover, it should be emphasized that while the content of two applications is shown in the non-primary region 306, the non-primary region 306 more generally may present the content of any number of applications, including the content of only a single application.

In a preferred implementation, the immersive environment 302 in the application work area 300 does not include any system chrome. System chrome refers to the user-interactive graphical elements provided by the system for identifying and managing the regions or windows (e.g., primary and non-primary regions 304 and 306). For example, in the case of Microsoft Windows®, system chrome includes the start button, maximize and minimize buttons, taskbars, title bar labels, and so on. System chrome does not include, however, non-user interactive graphical elements such as visible lines and blank areas that may be provided to visually separate the content of different applications but which do not allow the user to manage the applications.

In some implementations the primary region 304 occupies a substantially larger portion of the work area 300 than the non-primary region 306. This allows the user to interact with applications that present content in the primary region 304 which is currently the principal focus of the user's attention. Content presented by other applications which is of lesser immediate importance or less demanding of the user's attention may then be presented in the smaller non-primary region 306 of the work area 300. In this way the user can focus on his or her most important tasks, while still having immediately access to the content provided by other applications.

The non-primary region 306 may be presented anywhere within the work area 300. Its location may be fixed or variable. For instance, in the case of a variable location, the location of the non-primary region may be user-selectable and/or selected by immersive environment module 124 based, for example, on the capabilities of the display device. On the other hand, if the location of the non-primary region 306 is fixed, it may be docked to one side of the work area 300. Such an arrangement, which is shown in the example of FIG. 2, allows the content in the primary region 304 to be more centrally presented within the work area 304, where it can be most conveniently be viewed by the user.

Example Methods

Figure 3:
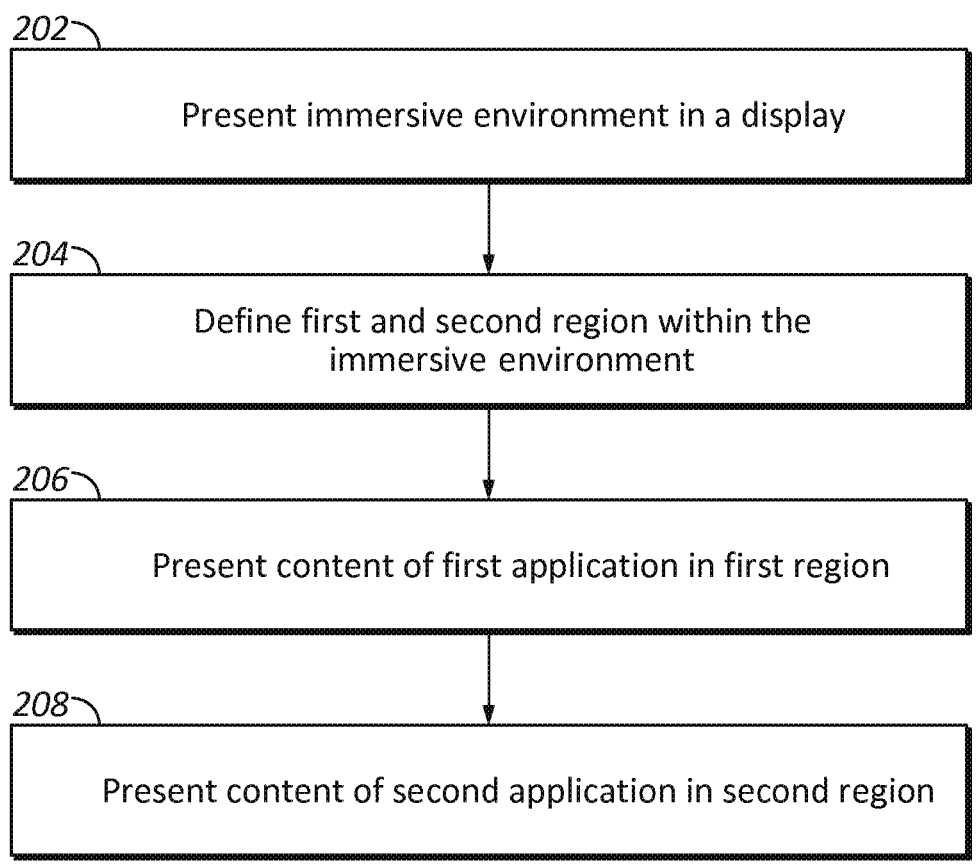
FIG. 3 illustrates a method for presenting the content of various applications in an immersive environment.

FIG. 3 depicts a method for presenting the content of various applications in an immersive environment. In portions of the following discussion reference may be made to illustrative system 100 of FIG. 1 and illustrative immersive environment 302 of FIG. 2, reference to which is made for example only.

Block 202 presents an immersive environment on a display. The immersive environment does not include system chrome. At block 204 a first region and a second region are defined within the immersive environment. The first and second regions do not overlap with one another and therefore are visible to a user at the same time. The first region may be a primary region that is larger in size than the second region. The second region may then serve as a non-primary region that is docked to one side of the display.

At block 206 the content of a first executing user-interactive application is presented in the first region. Likewise, at block 208 the content of one or more other executing user-interactive applications are presented in the second region. The content respectively presented in the first and second regions is presented simultaneously with one another. When two or more applications are presented in the non-primary region, they may be arranged so that that they do not overlap one another.

Figure 4:
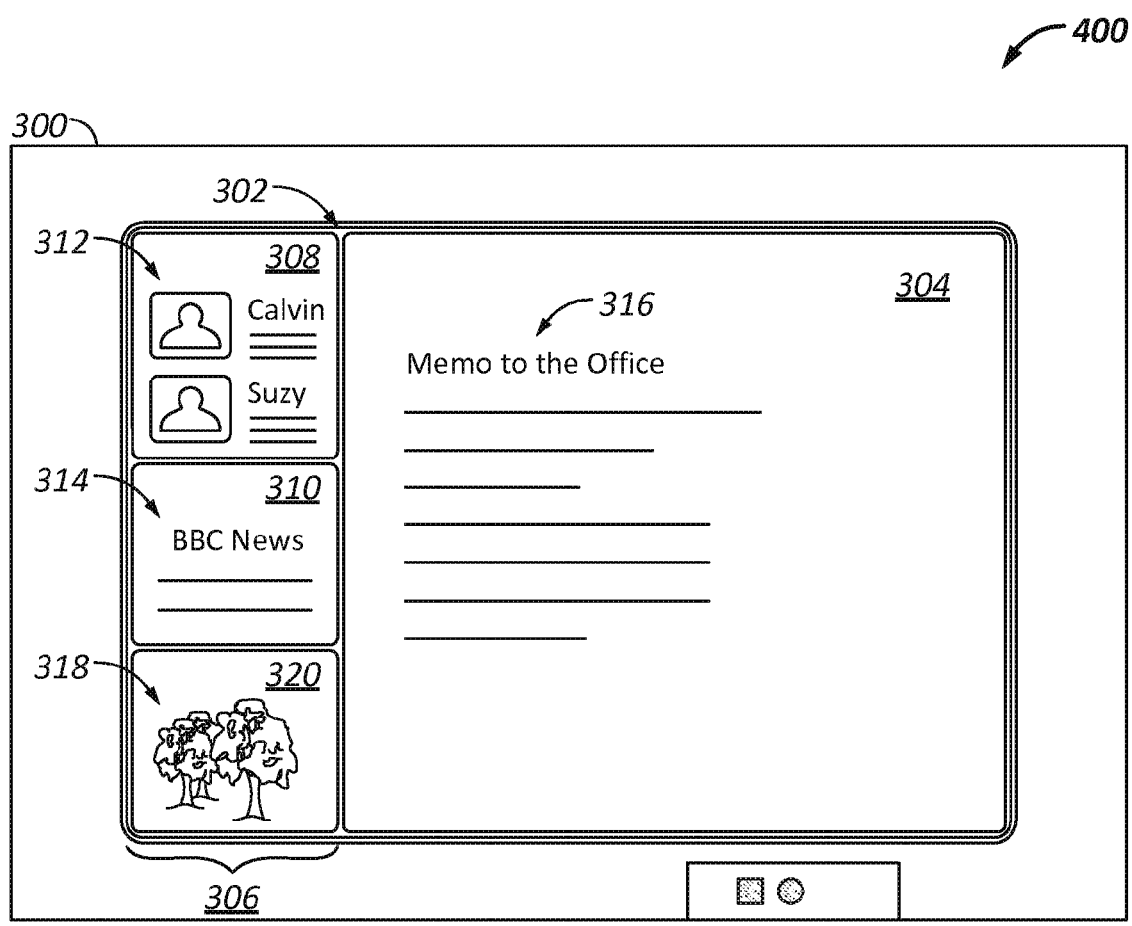
FIG. 4 illustrates an example immersive environment in which the content of four applications is presented.

In some cases the non-primary region may be fixed in size. Accordingly, to ensure that content presented by different applications do not overlap with one another, as additional content from additional applications is presented in the non-primary region, the amount of space allocated to each application decreases. For instance, FIG. 4 shows an application work area 400 similar to the application work area shown in FIG. 2, except that in FIG. 4 the content 312, 314 and 318 of three applications is presented in the non-primary region 306 while the content 312 and 314 from only two applications is shown in FIG. 2.

Figure 5:
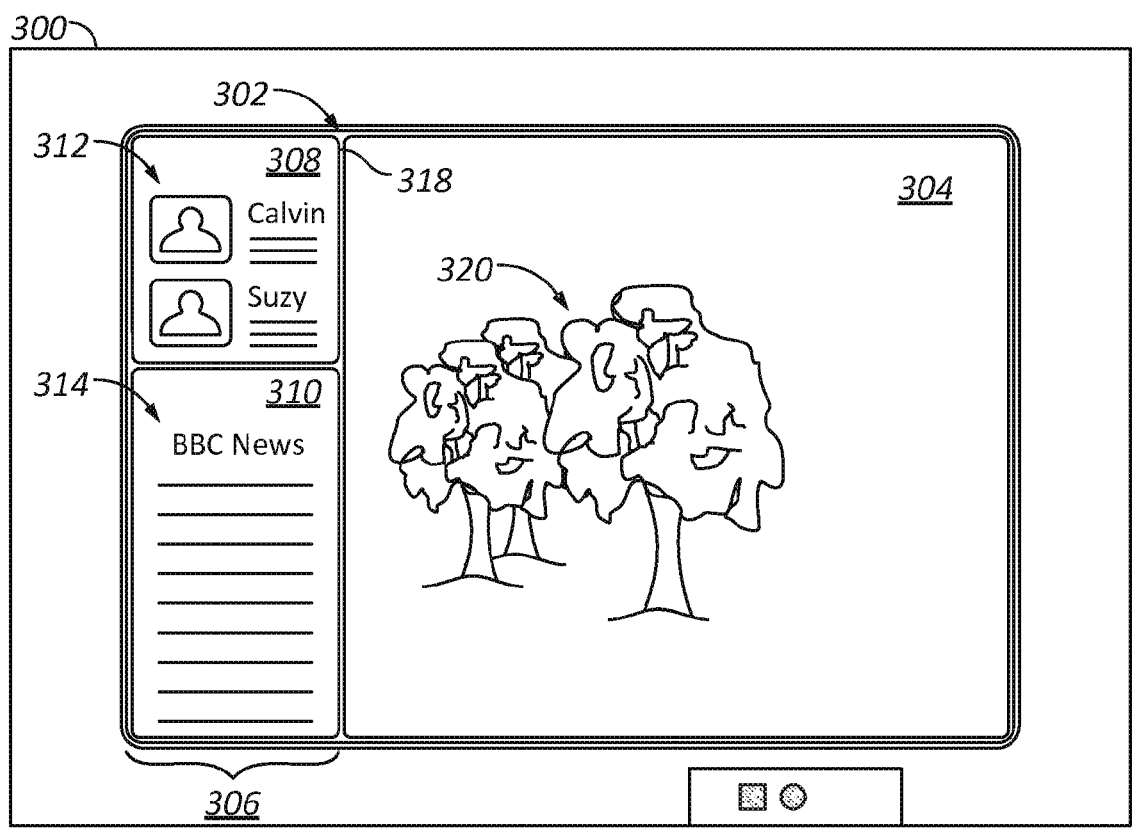
FIG. 5 illustrates an example immersive environment in which the content of the application presented in the primary region of FIG. 2 is replaced with the content of a different application.

The content displayed in the primary region may be replaced with the content of another application. For instance, if the user opens a new application that is to be presented in the primary region, the content that is currently being presented may be removed from the immersive environment or, alternatively, it may be moved into the non-primary region. FIG. 5 shows an application work area in which the content 316 shown in the primary region of FIG. 2 has been replaced with the content of a photo editing application. In this example the original content has been replaced by the content 320 of the photo editing application.

Figure 6:
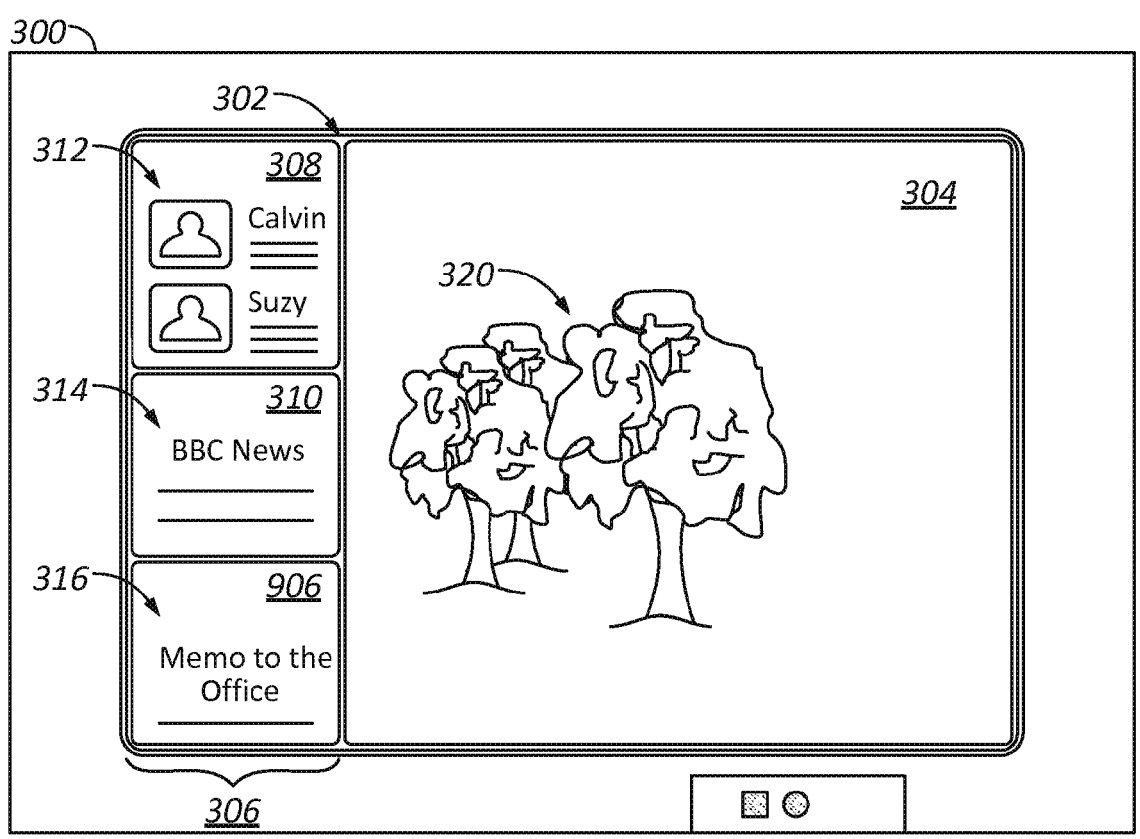
FIG. 6 illustrates an example immersive environment in which the content of the application presented in the primary region of FIG. 2 has been moved to the non-primary region and the content of another application is presented in the primary region.

In some cases the content of one or more applications can be maintained ("pinned") on the display by the user. When an application is pinned, the application remains in either the primary region or the non-primary region, and is movable from one region to the other. For instance, if the user pins the content 312, 314 and 320 in FIG. 5 to the display, then when as in FIG. 6 the content 316 of another application is displayed, the content 312, 314 and 320 remains on the screen. That is, in FIG. 6, the original content 316 of the document-viewing application has been added to the non-primary region 306 without replacing the content 312 and 314 of the social networking website and the news website which are presented by web browser applications. The user may also pin the content 316 to the display. In this case, since the content of all three applications is pinned, if the user then moves content 320 from the primary region to the non-primary region, the content 316 will be automatically moved from the non-primary region to the primary region.

In general, the content of a given applications may be able to be presented in both the primary region 304 and the non-primary region 306. In some cases, however, an application may be configured so that it can only be presented in one of the regions.

In some implementations the user may be able to remove the non-primary region 306 so that the content in the primary region 304 can occupy the entire work area. At a later time the user can also restore the non-primary region 306. In addition, under certain circumstances the manager 124 may automatically remove the non-primary region. For instance, if the display is rotated into portrait mode the non-primary region may be removed. Likewise, when it is rotated back to landscape mode the manager 124 may restore the non-primary region.

Any of a wide variety of techniques and apparatuses may be provided for allowing users to manage the immersive environment. Such user interface techniques enable a user to select when, where, and/or under what conditions to present applications in this immersive environment. For instance, the manager module 124 of FIG. 1 may enable a user to manage the immersive environment and the applications presented in the environment. In particular, the manager module 124 may enable selection of the user interface with a non-visual selector, such as a hot key or selector movement (e.g., a mouse selector moved to a right edge of primary region 304) or, in the case of a touch screen, a gesture. In some other cases, however, the manager module 124 enables selection through a displayed, selectable user interface control. Illustrative examples of user interface techniques and apparatuses that may be used in connection with an immersive environment may be found in co-pending U.S. application Ser. No. 12/969,474.

Regardless of the particular user interface that is employed, the techniques for creating an immersive environment discussed herein allow users to simultaneously manage multiple applications. Assume, for example, that a user wishes to select a music application that he used yesterday while maintaining an immersive presentation of work-related memos that are currently in a primary area of an immersive environment. These techniques can provide a user interface that presents recently-used applications, such as the music application, and enables the user to quickly and easily present the music application in the primary area while automatically moving the work-related memos into the non-primary area of the immersive environment.

Also by way of example, assume that a user wishes to begin his immersive session each day with the same three applications—a sports website, a business-news website, and work-related memos. These techniques permit the user to select these three applications to be automatically presented and maintained in the immersive environment. The user may simply open the immersive environment or logon to his computing device to have these three applications presented in the environment.

In some implementations the amount of space allocated to the applications when they are presented in the non-primary region of the display may be determined at least in part on minimum maximum sizes that are specified by the applications themselves. This capability allows application developers to effectively participate in the process used by the immersive environment module 122 and/or the manager module 124 when determining how the content of their applications will be presented on the display. For example, different content from different applications may require different amount of screen space in order to be useful. Accordingly, different applications may specify different minimum sizes below which they should no longer be presented in the non-primary region of the display. Likewise, there may be a maximum size above which content may no longer be useful in practice, either because of resolution limitations or for other reasons.

To address these issues applications may specify the size or sizes at which they may be presented on a display device. The allowable size or sizes of an application may be specified in any suitable manner. For instance, an application may specify size requirements such as maximum and/or minimum size limits, a series (i.e., two or more) of different sizes at which the application's content may be presented, a single fixed size, and so on.

The applications may be configured in a well-known manner to expose one or more APIs (application programming interfaces) to enable the immersive environment module 122 and/or the manager module 124 to present the content of the applications in the non-primary region of a display in accordance with the applications' size requirements.

The manager module 124 will attempt to simultaneously present the content from all currently-executing applications while accommodating or satisfying the size requirements specified by each of those applications. To accomplish this, the manager module 124 can be provisioned with display space allocation rules, which may include tie-breaking rules in the event that the size specifications of two or more applications cannot be satisfied. If it is not possible to satisfy the size requirements of any given application, the user will simply not be able to DOCK it in the non-primary region. To the extent that the immersive environment module 122 and/or the manager module 124 can present the content of an application in multiple sizes supported by the application while accommodating any other currently-executing applications, the user may be given the opportunity to choose the size that is actually used.

As previously mentioned, in some implementations the non-primary region 306 shown in FIG. 2 is fixed in size. For instance, it may occupy the full height of the display while having a fixed width of, in one example, 320 pixels. Accordingly, when the size of the non-primary region is fixed in this manner the content of any applications docked in the non-primary region will be fixed in width and will vary in height depending on its size (e.g., height) specifications as well as the size specifications of any other applications that are currently docked.

The height specifications exposed by an application to the manager module 124 may include one or mandatory specifications that are required by the manager module 124. In addition, the manager module 124 may also recognize optional specifications. In some cases a minimum height may be a mandatory specification required by the manager module 124. The manager module 124 may require the minimum height to be no less than some specified value (e.g., between 48 and 240 pixels). If the application specifies an invalid value for the minimum height (e.g., a value outside of the minimum range required by the manager module 124), the application's content will be presented in the non-primary region with a height corresponding to some default value.

It should be noted that reference to height, height requirements, and the like is by way of illustration only. More generally, size requirements may refer to a size in any direction and not simply height. That is, a size requirement may specify the length in one direction of the area occupied by the content of an application in the non-primary region of the display. The direction may be along a vertical axis, a horizontal axis, or any axis there-between.

The specification of a maximum height may be mandatory or optional. If it is specified it should be greater than the minimum specified height. In some cases it may have a default value, which, for example, may be set to infinity, in which case the content of the application will fill whatever portion of the non-primary region is unoccupied.

In some implementations the manager module 124 may also require applications to specify their fill capabilities, which may be specified by selecting among three options: fill, no fill, and fill to maximum size. If the fill option is selected, the application will fill whatever space (e.g., height) is available in the non-primary region down to its minimum size (e.g., height). If the no fill option is selected, the application will only be presented at its minimum size regardless of how much space is available in the non-primary region. Finally, if the fill to maximum size option is selected, the application will fill whatever space (e.g., height) is available in the non-primary region up to its maximum size.

Figure 7:
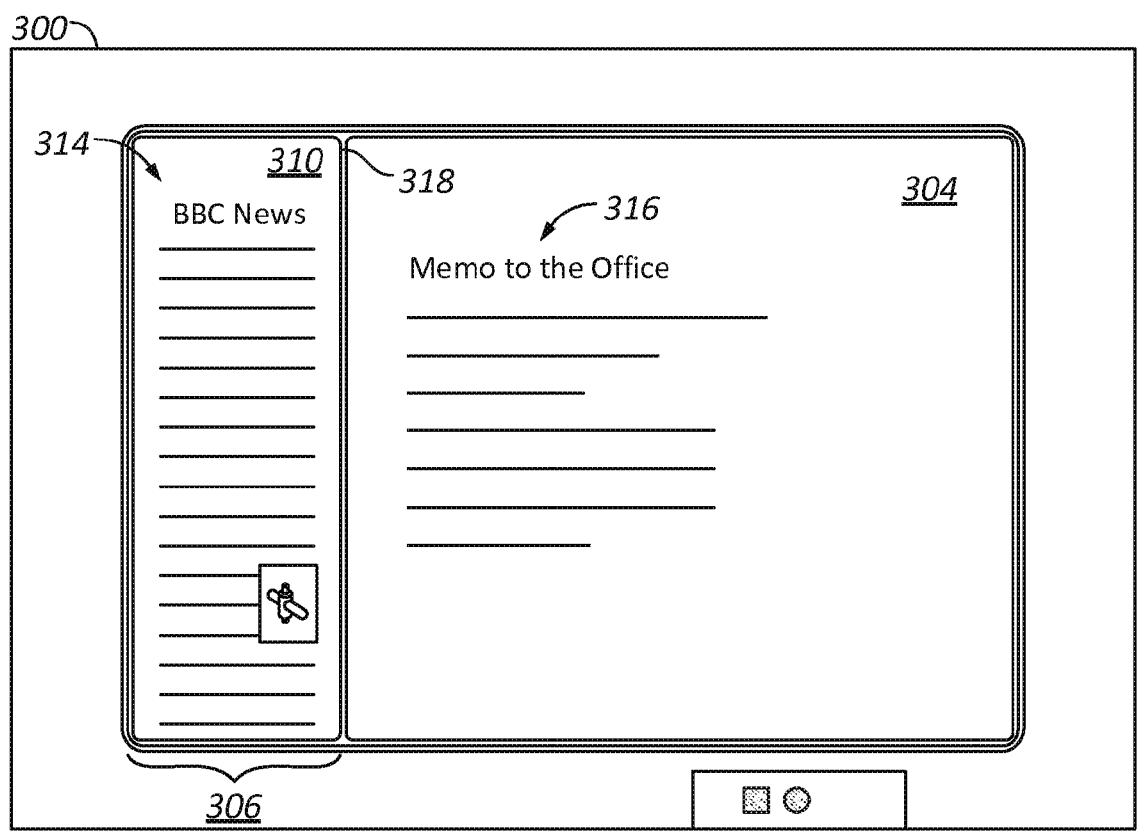
FIG. 7 illustrates an example immersive environment in which the content of a single application fills the non-primary region.

FIG. 7 shows an example immersive environment in which the content 314 of an application is presented in the non-primary region 310. In this example the application has specified its fill capability as fill. Accordingly, as shown, the content 314 occupies all the available space (height), which in this case is the entire non-primary region 306.

Figure 8:
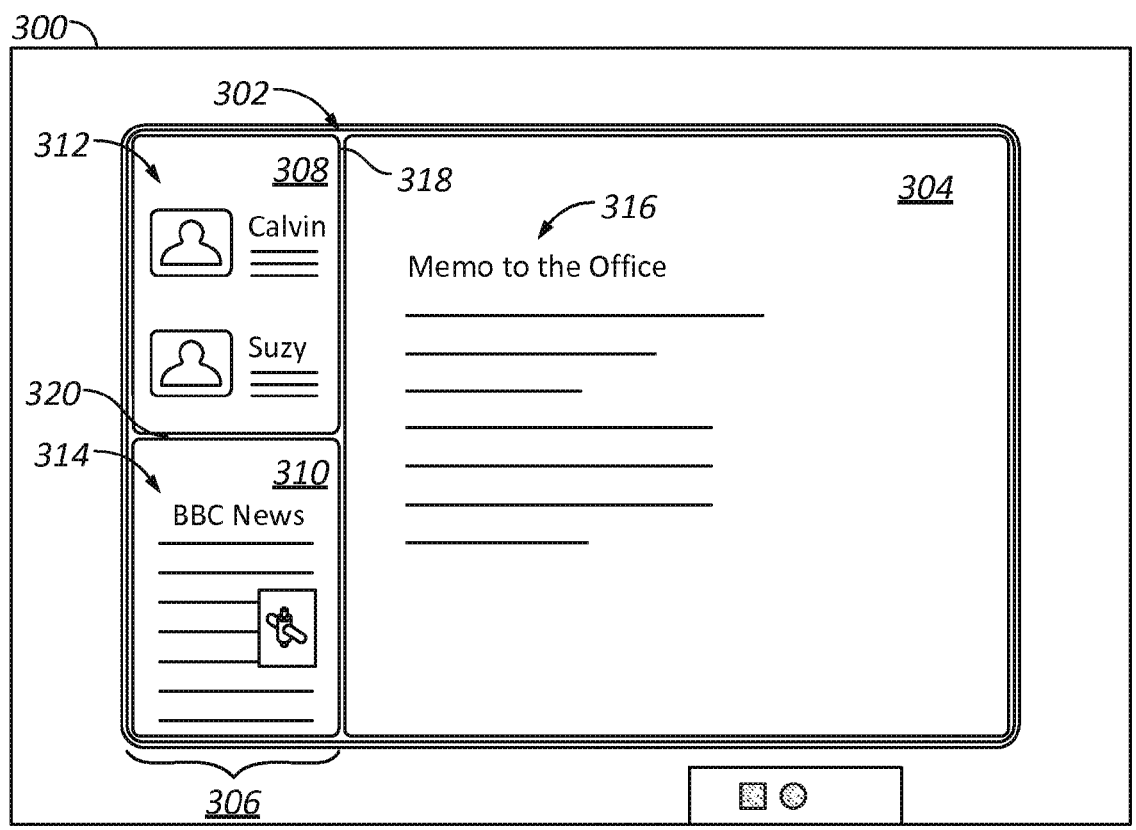
FIG. 8 illustrates an example immersive environment in which the content of two applications equally share the non-primary region.

FIG. 8 shows another example immersive environment in which the content of two applications is presented in the non-primary region. Similar to FIG. 2, the immersive environment presents the content 312 from one web browser application and content 314 from a second web browser application in non-primary region 306. In this example both applications have specified their respective fill capabilities as fill. Accordingly, as shown, the content 312 and content 314 equally share the entire non-primary region 306.

Figure 9:
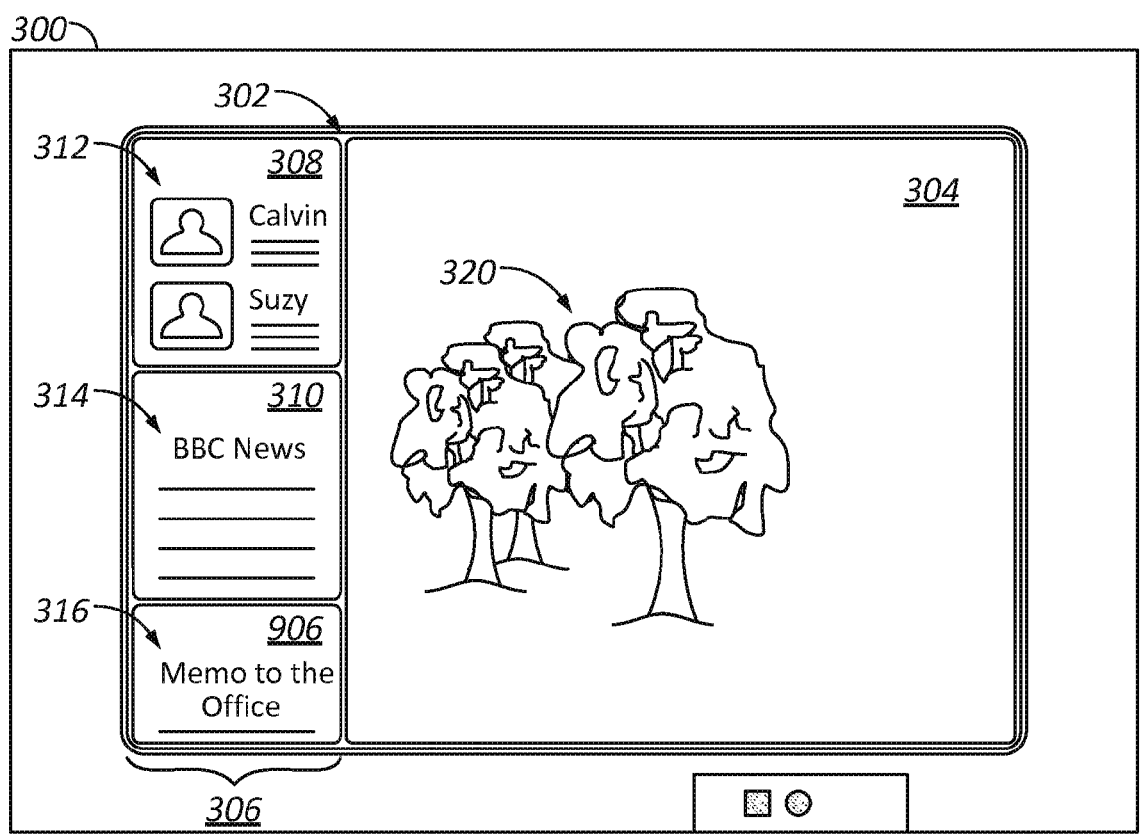
FIG. 9 illustrates an example immersive environment in which the content of three application are presented in the non-primary region, one of which has been minimized by the user and the other two of which equally share the remaining space in the non-primary region.

FIG. 9 shows yet another example immersive environment in which the content of three applications is presented in the non-primary region. In this example case the content 316 of one application has been specified as no fill by the user and the content 312 and 314 of the other two applications have specified their respective fill capabilities as fill. Accordingly, as shown, the content 312 and 314 of the two applications share the remaining space (e.g., height) that is not occupied by the content 316 of the application, which is presented at its minimum size.

The preceding discussion describes methods in which the techniques may operate to provide an immersive environment in the work area of a display. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 10:
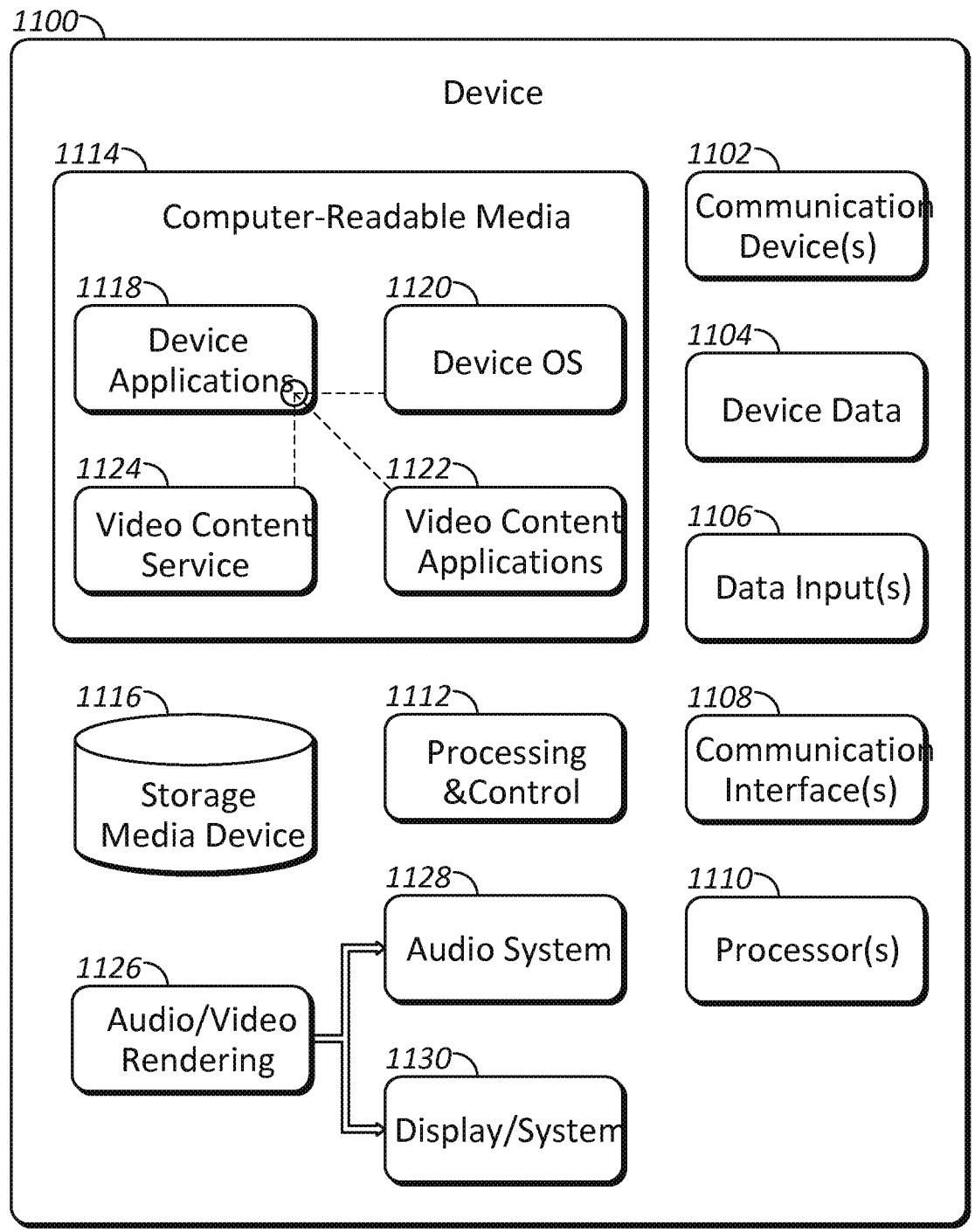
FIG. 10 illustrates an example device in which techniques for creating an immersive environment can be implemented.

FIG. 10 illustrates various components of an example device 1100 that can be implemented as any type of client, server, and/or computing device as described with reference to the previous FIGS. 1-9 to implement techniques for managing an immersive environment. In embodiments, device 1100 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to implement embodiments for managing an immersive environment. Alternatively or in addition, device 1100 can be implemented with any one or combination of hardware, firmware, or fixed logic circuitry that is implemented in connection with processing and control circuits that are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and non-transitory data storage (in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewritable compact disc (CD), any type of digital versatile disc (DVD), and the like. Device 1100 can also include a mass storage media device 1116.

Computer-readable storage media 1114 provides data storage mechanisms to store device data 1104, as well as various device applications 1118 and any other types of information and/or data related to operational aspects of device 1100. For example, device operating system 1120 can be maintained as a computer application with computer-readable storage media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components or modules to implement techniques for managing an immersive environment. In this example, device applications 1118 can include video content applications 1122, such as when device 1100 is implemented as a client device. Alternatively or in addition, device applications 1118 can include a video content service 1124, such as when device 1100 is implemented as a media content service. Video content applications 1122 and video content service 1124 are shown as software modules and/or computer applications. Alternatively or in addition, video content applications 1122 and/or video content service 1124 can be implemented as hardware, software, firmware, or any combination thereof.

Device 1100 also includes an audio and/or video rendering system 1126 that generates and provides audio data to an audio system 1128 and/or generates and provides display data to a display system 1130. Audio system 1128 and/or display system 1130 can include any devices that process, display, and/or otherwise render audio, display, and image data. Display data and audio signals can be communicated from device 1100 to an audio device and/or to a display device via an RF (radio frequency) link, S-video link, composite video link, component video link, DVI (digital video interface), analog audio connection, or other similar communication link. In an embodiment, audio system 1128 and/or display system 1130 are implemented as external components to device 1100. Alternatively, audio system 1128 and/or display system 1130 are implemented as integrated components of device 1100.

Techniques for providing an immersive environment, of which the above-described methods are examples, may be embodied on one or more of the entities shown in system 100 of FIG. 1 and/or example device 1100 described above, which may be further divided, combined, and so on. Thus, system 100 and/or device 1100 illustrate some of many possible systems or apparatuses capable of employing the described techniques. The entities of system 100 and/or device 1100 generally represent software, firmware, hardware, whole devices or networks, or a combination thereof. In the case of a software implementation, for instance, the entities (e.g., manager 124 of FIG. 1) represent program code that performs specified tasks when executed on a processor (e.g., processor(s) 116 of FIG. 1). The program code can be stored in one or more computer-readable memory devices, such as computer-readable storage media 118 or computer-readable media 1114. The features and techniques described herein are platform-independent, meaning that they may be implemented on a variety of commercial computing platforms having a variety of processors.

CONCLUSION

Although embodiments of techniques and apparatuses for managing an immersive environment have been described in language specific to features and/or methods, it is to be understood that the subject of the appended claims is not necessarily limited to the specific features or methods described. Rather, the specific features and methods are disclosed as example implementations for managing an immersive environment.

What is claimed is:
1. A computing device comprising:
one or more computer processors; and
one or more computer-readable storage media having instructions stored thereon that, responsive to execution by the one or more computer processors, perform operations comprising:
receiving a first selection of a first application for parallel presentation in an immersive environment on one or more displays associated with the computing device;
responsive to the first selection, determining an amount of space of a primary region of the immersive environment to allocate for display of the first application, the primary region of the immersive environment not having system chrome;

responsive to the first selection, causing content of the first application to be displayed in the space of the primary region allocated for display of the first application;
receiving a second selection of a second application for parallel presentation with the first application in the immersive environment on the one or more displays associated with the computing device;
responsive to the second selection, determining an amount of space of a non-primary region of the immersive environment to allocate for display of the second application, the non-primary region of the immersive environment not having system chrome, the amount of space of the non-primary region to allocate for the display determined based on a predefined fill, no fill, or fill to maximum size requirement of requirements specified in the second application, the amount of space being:
for the predefined fill size requirement, all available space in the non-primary region;
for the predefined no fill size requirement, an amount of space within the non-primary region equal to the minimum size specified by the predefined no fill requirement; or
for the predefined fill to maximum size requirement, all available space within the non-primary region equal to or less than a maximum size specified by the predefined fill to maximum size requirement;
responsive to the second selection, causing selected content of the second application to be displayed in the space of the non-primary region allocated for display of the second application, the selected content of the second application based on the requirements specified in the second application and the selected content being less than content of the second application that would be displayed in the space of the primary region allocated for display; and
enabling interaction with the second application through the non-primary region of the immersive environment and with the first application presented in the primary region of the immersive environment.

2. A computing device as recited in claim 1, the operations further comprising resizing the selected content of the second application for display in the non-primary region based on the one of the predefined size requirements.

3. A computing device as recited in claim 1, wherein the one of the predefined size requirements is the predefined no fill size requirement.

4. A computing device as recited in claim 1, the operations further comprising, in response to receiving a third selection to minimize the selected content of the second application, reducing the amount of space of the non-primary region allocated for display of the selected content of the second application based on a minimum height requirement of one of the predefined size requirements.

5. A computing device as recited in claim 1, wherein the one of the predefined size requirements is the predefined fill to maximum size requirement.

6. A computing device as recited in claim 1, wherein the one of the predefined size requirements further indicates whether to allocate the amount of space of the non-primary region based on an amount of currently unoccupied space in the non-primary region.

7. A computing device as recited in claim 1, wherein the one of the predefined size requirements of the second application specifies a height requirement or a width requirement as a number of pixels.

8. A computing device as recited in claim 1, wherein determining the amount of space of the non-primary region to allocate is also based on a predefined size requirement of the first application displayed in the primary region of the immersive environment.

9. One or more computer-readable storage media comprising instructions that, responsive to execution by a computing device, cause the computing device to perform operations comprising:
presenting first content of a first application in a primary region of an immersive environment, the primary region of the immersive environment not having system chrome;
receiving selection of second content of a second application for presentation in the primary region of the immersive environment;
causing presentation of the first content of the first application to be moved to a non-primary region of the immersive environment, the non-primary region of the immersive environment not having system chrome and being smaller than the primary region;
causing the first content, when presented in the non-primary region of the immersive environment, to be adjusted in accordance with content sizing requirements associated with the first application, the adjustment causing the first content when displayed in the non-primary region to be less than the first content when displayed in the primary region, the content sizing requirements including a fill, no fill, or fill to maximum size requirement and the adjustment causing the first content to be displayed filling the non-primary region for the fill requirement, filling a minimum size for the no fill requirement, or filling available space within the non-primary region equal to or less than a maximum size for the fill to maximum size requirement;
causing the second content of the second application to be presented in the primary region of the immersive environment; and
enabling interaction with the first content through the non-primary region of the immersive environment and with the second content presented in the primary region of the immersive environment.

10. One or more computer-readable storage media as recited in claim 9, wherein the content sizing requirements associated with the first application are exposed through an application programming interface (API) associated with the first application.

11. One or more computer-readable storage media as recited in claim 9, wherein the content sizing requirements define a width at which the first content of the first application is to be presented within the immersive environment.

12. One or more computer-readable storage media as recited in claim 9, wherein the content sizing requirement is the no fill requirement and causing the first content to be adjusted includes ensuring that the non-primary region has a space sufficient to allow presentation of the first content in accordance with the minimum size.

13. One or more computer-readable storage media as recited in claim 9, wherein the operation of enabling interaction with the first content through the non-primary region of the immersive environment and with the second content presented in the primary region of the immersive environment presents the first content and the second content simultaneously and in parallel.

14. A computing device comprising:
one or more computer processors; and
one or more computer-readable storage media having instructions stored thereon that, responsive to execution by the one or more computer processors, perform operations comprising:
receiving selection of an application for parallel presentation in an immersive environment on one or more displays associated with the computing device;
responsive to the selection, determining an amount of space of a non-primary region of the immersive environment to allocate for display of the selected application, the non-primary region of the immersive environment not having system chrome, the amount of space of the non-primary region to allocate determined based on a predefined fill, no fill, or fill to maximum size requirement of requirements specified in the selected application, the amount of space being:
for the predefined fill size requirement, all available space in the non-primary region;
for the predefined no fill size requirement, an amount of space within the non-primary region equal to the minimum size specified by the predefined no fill requirement; or
for the predefined fill to maximum size requirement, all available space within the non-primary region equal to or less than a maximum size specified by the predefined fill to maximum size requirement;
causing selected content of the selected application to be displayed in the space of the non-primary region allocated for display of the selected application and in parallel with display of content of a different application presented in a primary region of the immersive environment, the primary region of the immersive environment not having system chrome, the selected content of the selected application being less than content of the selected application that would be displayed in a space of the primary region; and
enabling interaction with the selected application through the non-primary region of the immersive environment and with the different application presented in the primary region of the immersive environment.

15. A computing device as recited in claim 14, wherein the amount of space is all available space in the non-primary region.

16. A computing device as recited in claim 14, wherein the operations further comprise resizing content of another application displayed in another space of the non-primary region based on another size requirement of the other application.

17. A computing device as recited in claim 14, wherein the amount of space is equal to the minimum size specified by the size requirement.

18. A computing device as recited in claim 14, wherein the amount of space is equal to or less than a maximum size specified by the size requirement and a fixed width specified by the size requirement.

19. A computing device as recited in claim 14, wherein the amount of space is equal to the minimum size specified by the size requirement, wherein the size requirement of the selected application specifies a height requirement or a width requirement as a number of pixels.

20. A computing device as recited in claim 14, wherein the operation of determining the amount of space of the non-primary region to allocate is further based on another size requirement of another application displayed in another space of the non-primary region of the immersive environment.

* * * * *